(12) United States Patent
Smith et al.

(10) Patent No.: US 10,194,280 B2
(45) Date of Patent: Jan. 29, 2019

(54) SYSTEM AND METHOD FOR INTEGRATED EMERGENCY NOTIFICATION

(71) Applicant: Tresit Group, LLC, Logan, UT (US)

(72) Inventors: Cole W. Smith, Logan, UT (US);
Solomon C. Smith, Logan, UT (US);
Cody M. Smith, Logan, UT (US)

(73) Assignee: Tresit Group, LLC, Logan, UT (US)

( * ) Notice: Subject to any disclaimer, the term of this patent is extended or adjusted under 35 U.S.C. 154(b) by 0 days.

(21) Appl. No.: 15/411,684

(22) Filed: Jan. 20, 2017

(65) Prior Publication Data

US 2017/0215044 A1 Jul. 27, 2017

Related U.S. Application Data

(60) Provisional application No. 62/286,021, filed on Jan. 22, 2016.

(51) Int. Cl.
| | | |
|---|---|---|
| *G08B 21/02* | (2006.01) | |
| *H04W 4/04* | (2009.01) | |
| *G08B 25/00* | (2006.01) | |
| *H04L 12/58* | (2006.01) | |

(52) U.S. Cl.
CPC ............ *H04W 4/043* (2013.01); *G08B 21/02* (2013.01); *G08B 25/006* (2013.01); *H04L 51/043* (2013.01); *H04L 51/20* (2013.01)

(58) Field of Classification Search
CPC ...... G08B 21/02; G08B 25/006; G08B 25/14; G08B 27/00
See application file for complete search history.

(56) References Cited

U.S. PATENT DOCUMENTS

| | | |
|---|---|---|
| 5,621,798 A | 4/1997 | Aucsmith |
| 6,002,748 A | 12/1999 | Leichner |
| 7,224,957 B2 | 5/2007 | Spector |
| 7,286,648 B1 | 10/2007 | Chang et al. |
| 8,050,281 B2 | 11/2011 | Casey et al. |
| 8,150,925 B2 | 4/2012 | Zimmers et al. |
| 8,384,549 B2 | 2/2013 | Lemmon |
| 8,396,447 B2 | 3/2013 | Reich et al. |
| 2003/0187570 A1 | 10/2003 | Impson et al. |
| 2004/0193617 A1 | 9/2004 | Adler |
| 2005/0181775 A1 | 8/2005 | Rideout, Jr. et al. |
| 2007/0216535 A1 | 9/2007 | Carrino |

(Continued)

*Primary Examiner* — Hongmin Fan
(74) *Attorney, Agent, or Firm* — Kirby Drake

(57) ABSTRACT

A system and method for integrated emergency notification is provided. It may be decentralized and integrate essential notification functions to manage an emergency situation through a single system. Accordingly, in the event of an active threat or other emergency at a location (i.e., a building), the system and method according to embodiments of the present disclosure may provide an immediate, effective way to simultaneously notify/alert users that may be on-site as well as first responders and other interested parties of emergencies and provide a means of communicating site-specific information to one another, such as through a real-time chat feature. The system and method may provide color-coded floor plans that may be updated to show user status, automatically detect inactivity, and provide easy-to-use reference materials for standard response procedures that may be employed depending on the type of alert situation.

11 Claims, 8 Drawing Sheets

(56) References Cited

U.S. PATENT DOCUMENTS

| | | | |
|---|---|---|---|
| 2008/0194236 A1 | 8/2008 | Johns | |
| 2009/0040038 A1* | 2/2009 | Huber | G08B 7/066 |
| | | | 340/527 |
| 2009/0251312 A1 | 10/2009 | Shelton et al. | |
| 2010/0009651 A1 | 1/2010 | Daly et al. | |
| 2010/0306322 A1 | 12/2010 | Conahan | |
| 2012/0003952 A1 | 1/2012 | Gabriel | |
| 2012/0092161 A1 | 4/2012 | West | |
| 2012/0329420 A1 | 12/2012 | Zotti et al. | |
| 2013/0035055 A1 | 2/2013 | Kirchmeier et al. | |
| 2013/0052982 A1 | 2/2013 | Rohde et al. | |
| 2013/0318427 A1* | 11/2013 | Milewski | G06F 17/241 |
| | | | 715/233 |
| 2014/0306802 A1* | 10/2014 | Hibbs, Jr. | G08B 27/006 |
| | | | 340/7.58 |
| 2015/0130609 A1* | 5/2015 | Jacobs | G08B 25/12 |
| | | | 340/517 |
| 2015/0179052 A1* | 6/2015 | Covington | G08B 25/14 |
| | | | 348/143 |
| 2015/0348220 A1* | 12/2015 | Sharma | G06Q 50/265 |
| | | | 705/324 |
| 2016/0018226 A1* | 1/2016 | Plocher | A62B 3/00 |
| | | | 701/428 |
| 2018/0032997 A1* | 2/2018 | Gordon | G06Q 20/3224 |

\* cited by examiner

SYSTEM AND METHOD FOR INTEGRATED EMERGENCY NOTIFICATION

CROSS-REFERENCE TO RELATED APPLICATIONS

The present Application is a non-provisional and claims the benefit of U.S. Provisional Application No. 62/286,021 entitled "System and Method for Integrated Emergency Notification," filed Jan. 22, 2016, the disclosure of which is hereby incorporated by reference in its entirety.

FIELD OF THE DISCLOSURE

The present disclosure generally relates to emergency notifications, and more particularly to a system and method for integrated emergency notification.

BACKGROUND

In the event of an active threat or other emergency at a location, there is presently no immediate, effective way to simultaneously notify all those at the location as well as first responders of the emergency and communicate relevant information easily. The options presently available are not instant, widespread, and/or do not provide two-way communication with specific insight into the emergency.

SUMMARY

Embodiments of the present disclosure may provide an immediate, effective way to simultaneously notify affected users at a location as well as first responders and others of an emergency and provide a means of sharing location-specific information associated with an alert. In the event of an emergency, a user or first responder can instantly trigger an alert within a few seconds using any communication device. A system and method according to embodiments of the present disclosure also may provide real-time chat capability as well as color-coded floor plans that may be updated in real-time to show user/first responder status. The system also may be decentralized, allowing any user/first responder associated with a location or an emergency situation to send an alert.

Other embodiments of the present disclosure may provide a method for integrated emergency notification, the method comprising selecting an alert to be sent out to one or more additional users over a communication network; selecting an alert type; identifying one or more locations associated with the alert type, wherein at least one floor plan is associated with the one or more locations; selecting one of the at least one floor plan; viewing color coding associated with the selected one of the at least one floor plan, wherein the color coding is updated in real-time to show status; and receiving an action plan reminder associated with the alert type. The alert may be an audible alert that immediately notifies all users of one or more conditions associated with the alert, the alert may be a silent alert, and/or the alert may be an internal alert only to users at a location associated with the alert. The method may further comprise designating where presently located on the selected one of the at least one plan. The user may be prompted to designate where presently located after a predetermined period of inactivity. The alert type may be selected from the following: shooter, medical, bomb, hazmat, natural disaster, intruder, and other. The color coding may include a first color to indicate areas deemed to be safe, a second color to indicate areas deemed to be unsafe, and a third color to indicate areas where conditions are unknown. Written designations may be displayed in addition to color coding. The method also may include providing additional information about conditions associated with the alert type. The action plan reminder may be specific to one or more of the following: a floor, a building, a campus, and a city. The method may further include selecting one of three options from the action plan reminder, the three options comprising: run, fight and hide. The method also may include chatting in real-time with one or more persons associated with the one or more locations associated with the alert type.

Further embodiments of the present disclosure may provide a method for integrated emergency notification, the method comprising: using a communication device, monitoring one or more locations to identify an alert; when an alert is identified, selecting one of the one or more locations associated with the alert; identifying an alert type associated with the selected location; and entering one or more additional items of information associated with the alert type, the one or more additional items of information selected from the following: a radio channel associated with the selected location, an identification of a staging area to address the alert, details about the alert type, and an identification as to whether police have been notified. The monitoring step may include using a camera and at least one speaker integrated with the communication device, listening to sound and monitoring live video feed associated with the one or more locations. The method may further include locating and communicating with one or more persons associated with the selected location to provide assistance. Selecting one of the one or more locations associated with the alert further may comprise selecting from one or more floor plans; and selecting a particular location from the selected one or more floor plans. The method also may include viewing color coding associated with the selected one or more floor plans. The method may further include selecting a standardized action plan associated with the alert type and/or updating area layouts, maps, staging locations and radio channels associated with the alert.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a system and method for integrated emergency notification. It may be decentralized (i.e., allowing any user of the system to initiate an alert in an emergency situation, including an option for first responders to reverse notify users associated with a location if an alert has not yet been initiated in an emergency) and integrate essential notification functions to manage an emergency situation through a single system. Accordingly, in the event of an active threat or other emergency at a location (i.e., a building), the system and method according to embodiments of the present disclosure may provide an immediate, effective way to simultaneously notify/alert users that may be on-site as well as first responders and other interested parties of emergencies and provide a means of communicating site-specific information to one another, such as through a real-time chat feature. The system and method according to embodiments of the present disclosure may provide color-coded floor plans that may be updated in real-time to show user status, automatically detect inactivity, and provide easy-to-use reference materials for standard response procedures that may be employed depending on the type of alert situation, such as described herein.

Embodiments of the present disclosure may provide a system and method for users and first responders to access in an emergency situation. FIGS. 1A-1E provide screen shots depicting actions that a user may take in order to access and utilize a system and method according to embodiments of the present disclosure.

Figure 1A:
FIGS. 1A-1E depict screen shots illustrating actions that a user may take in order to access and utilize a system and method according to an embodiment of the present disclosure.
Figure 1B:
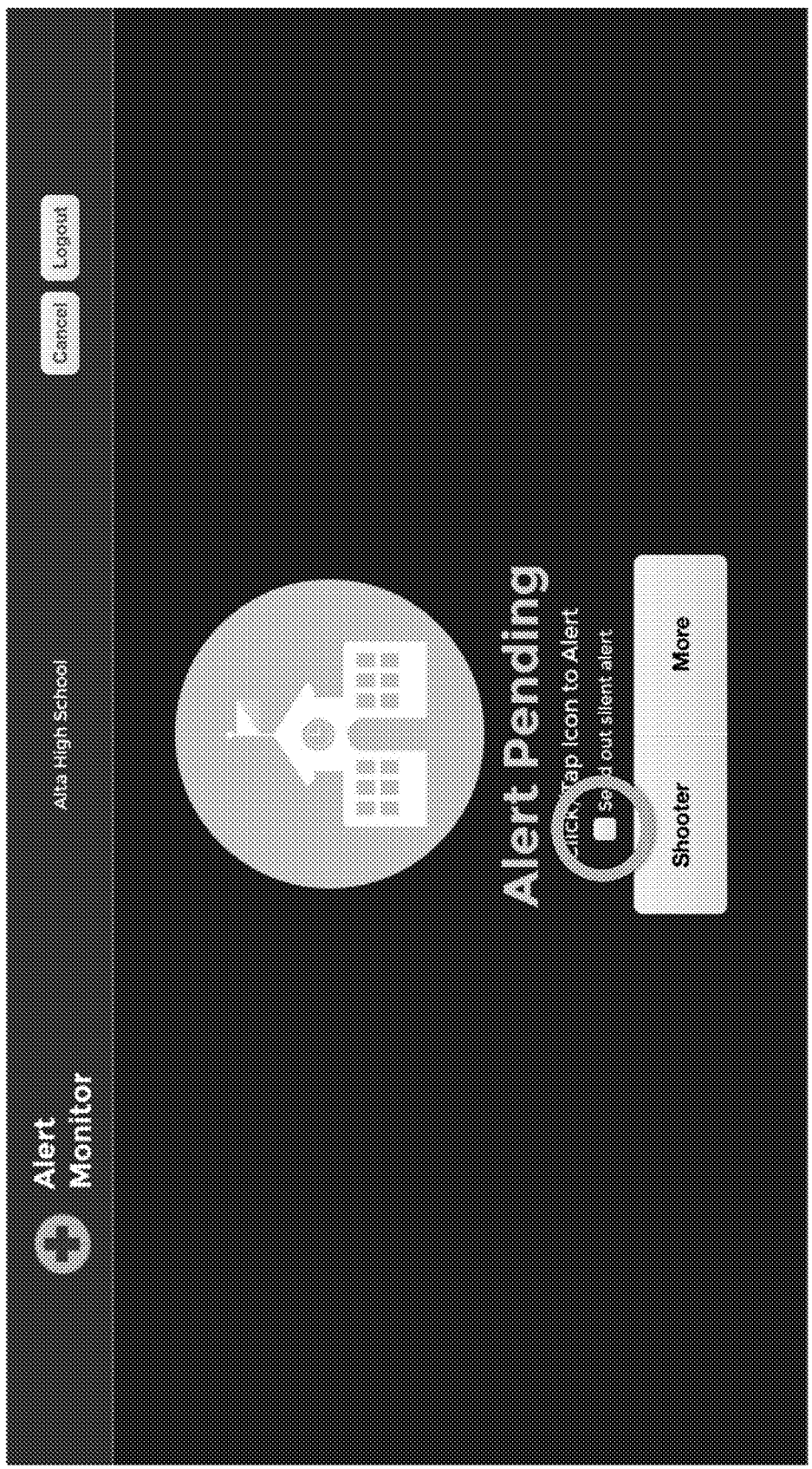

When a user wishes to send an alert (i.e., when an emergency situation occurs), he/she may select "send alert" to initiate use of the system (FIG. 1A). Upon opening the system and opting to send an alert, the system may transmit an audible alert to immediately notify all users of the condition(s) associated with the alert. However, the user sending the alert may opt to send out a "silent" alert instead (FIG. 1B). In some embodiments of the present disclosure, the user may elect to send only an "internal" alert to those at the location associated with the alert and not elect to notify first responders.

Figure 1C:
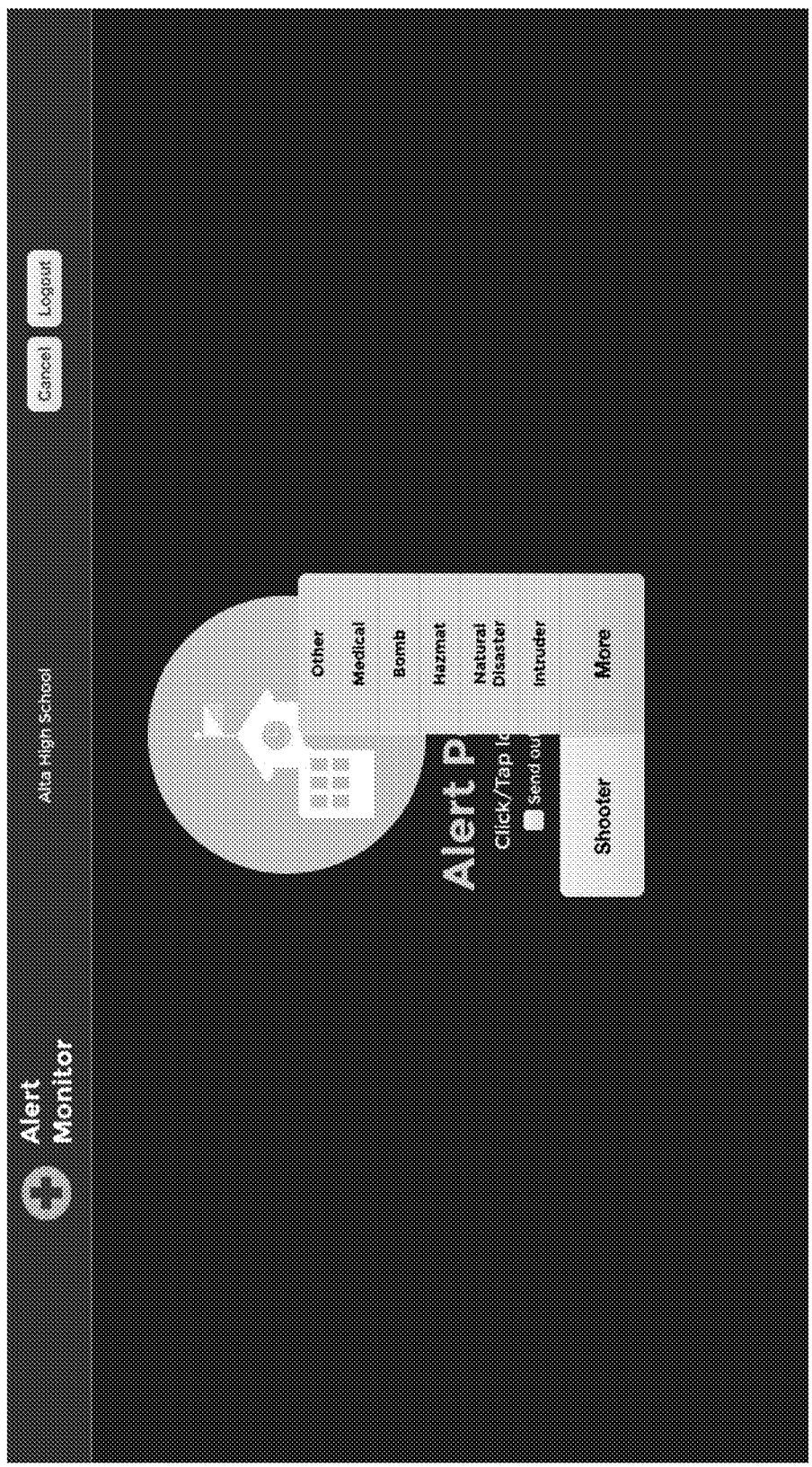

The user also may select the type of alert to be provided as depicted through the dropdown selection mechanism in FIG. 1C. Alert types may include but are not limited to shooter, medical, bomb, hazmat, natural disaster, and intruder. Also, as depicted in FIG. 1C, the user may be provided with an option to select "other" as an alert type if it does not fit in one of the specifically identified types. The user also may be provided with an option to select "more" and be provided with additional alert types from which to select. While a dropdown selection mechanism is provided, other input mechanisms may be utilized without departing from the present disclosure.

Figure 1D:
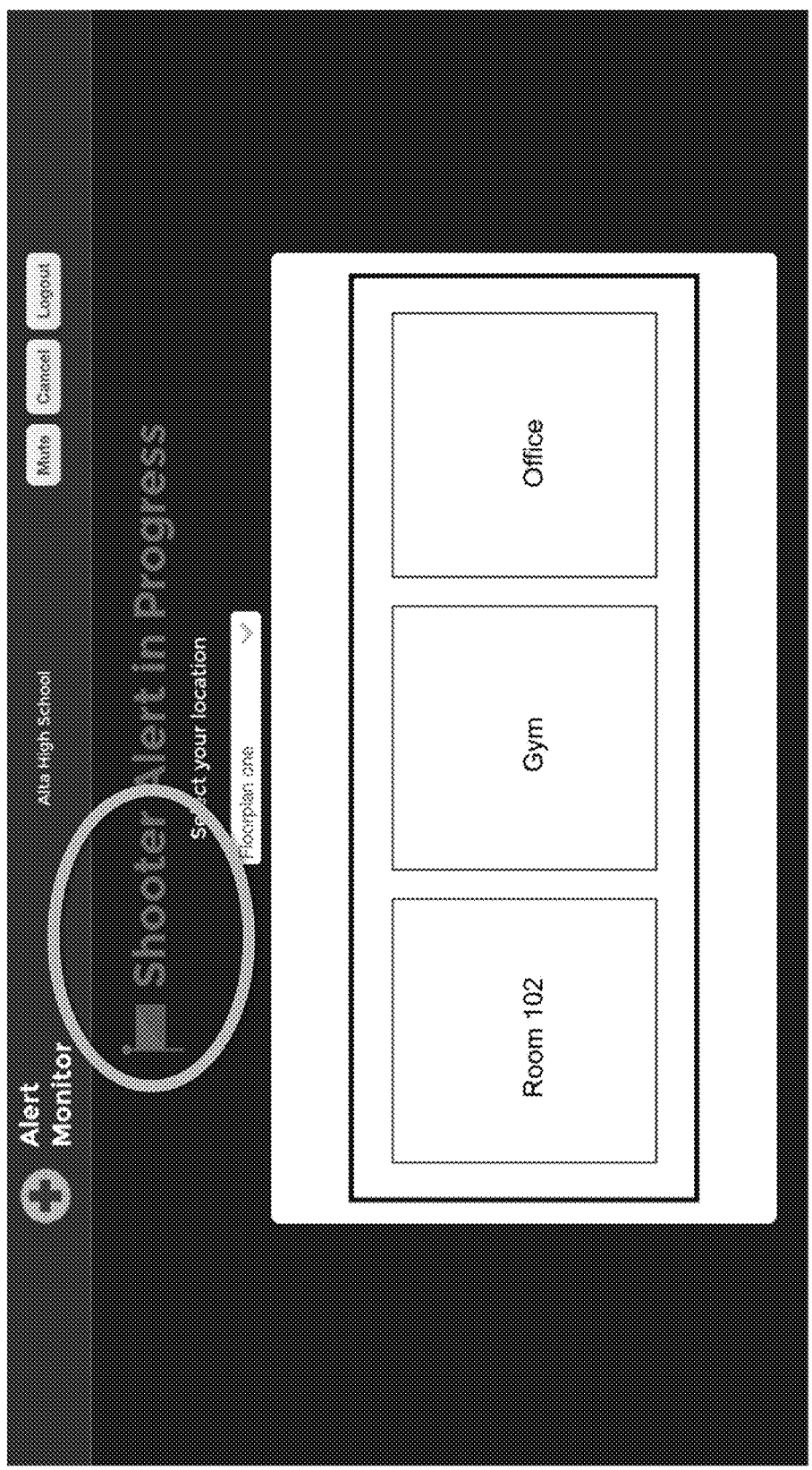

FIG. 1D depicts an embodiment of the present disclosure where the alert type selected is "shooter." In this embodiment, the user may be presented with the ability to select the location(s) within a building where the shooter may be located. It should be appreciated that the user may be presented with a dropdown menu that may allow the user to select from one or more floor plans and then select a particular location within the selected floor plan; however, other means for selection may be used without departing from the present disclosure. In this embodiment, the user is presented with Floorplan one, and this floor plan includes Room 102, Gym and Office. Different floor plans may be provided for different floors or wings of a building without departing from the present disclosure. Floor plans for different buildings also may be provided as options without departing from the present disclosure. More or fewer rooms or buildings may be depicted without departing from the present disclosure.

In some embodiments of the present disclosure, the user may assign or may view color coding associated with a selected/displayed floor plan. One or more colors may be provided. In an embodiment of the present disclosure, areas deemed to be safe may be assigned one color (i.e., green), areas deemed to be unsafe may be assigned a second color (i.e., red), and areas where the conditions are unknown may be assigned a third color (i.e., yellow). More or fewer than three colors/designations may be provided without departing from the present disclosure. Further, written designations (i.e., safe, unsafe, unknown) may be displayed in addition to or in place of color coding to address scenarios, for example, where a user may be color blind and unable to see the color designations.

In certain embodiments of the present disclosure, the user may designate where he/she is presently located on the floor plan. If the user wishes to change his/her location, the user may be prompted, for example, with a pop-up window, to confirm that the change should be made. However, it should be appreciated that there may be embodiments where the user may not be prompted to confirm that the change should be made. In some embodiments of the present disclosure, if the user has not had activity associated with the alert within a predetermined time period (i.e., 60 seconds), a prompt may be displayed asking the user to update his/her status. This update may be simply to confirm whether the user is safe or unsafe; however, other updates may be prompted without departing from the present disclosure.

Figure 1E:
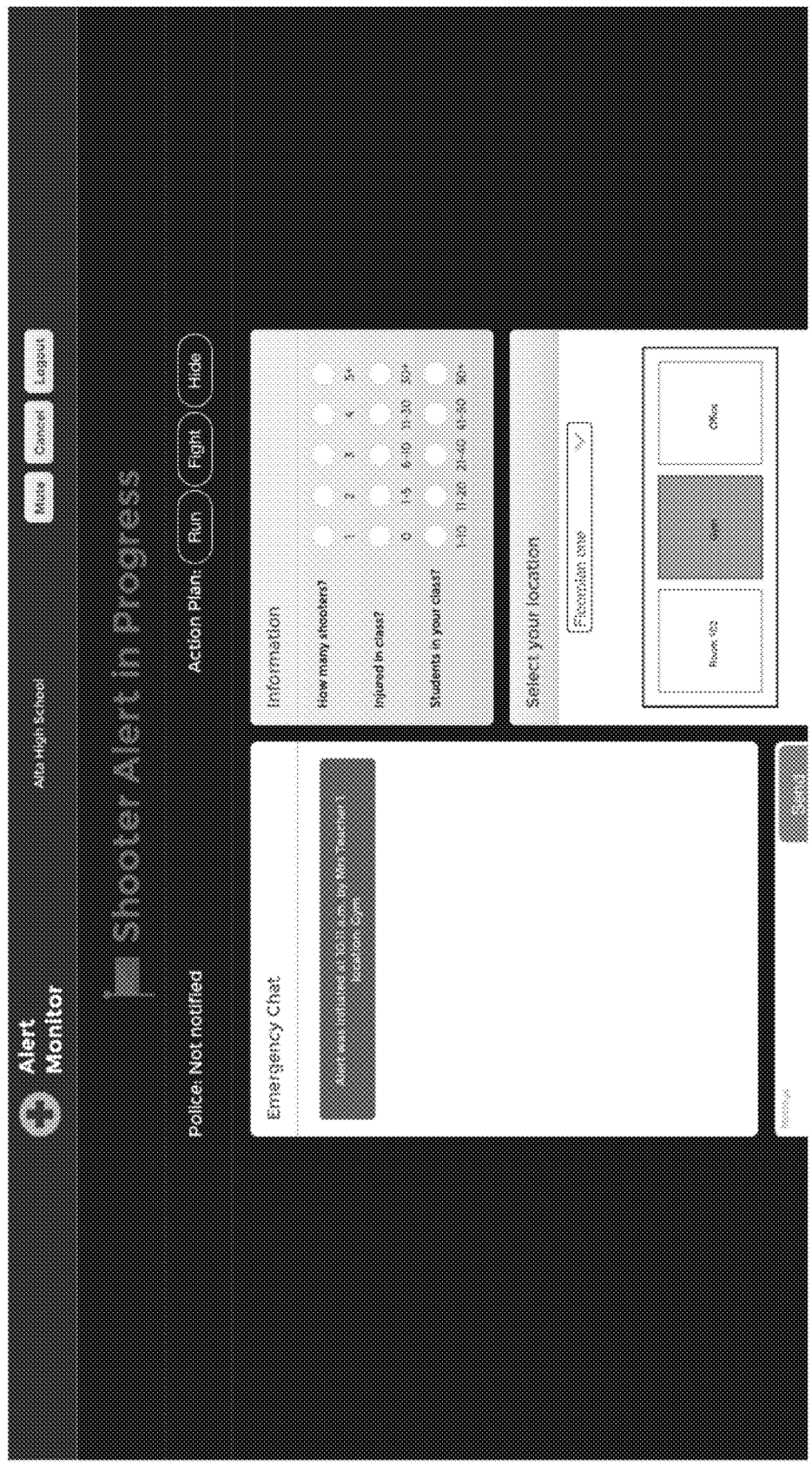

FIG. 1E depicts a screen that may be displayed to a user either before or after he/she has selected a location associated with the emergency condition subject to the alert (FIG. 1D). In this embodiment of the present disclosure, the screen depicts that the user has selected Floorplan one and further selected Gym as the location of the emergency condition. Additionally or alternatively, the user may have the option to provide further information about the alert conditions. When a shooter alert is in progress, the user may provide information, including but not limited to, the number of shooters, the number of injuries, and the number of people present. As FIG. 1E depicts a scenario where there is a shooter alert in a school, the user (i.e., a teacher) may be prompted to identify injuries in his/her class and also to identify the number of students in his/her class. However, it should be appreciated that the prompts for information may be more generalized without departing from the present disclosure. As depicted in FIG. 1E, for each of the prompts for information, the user may be presented with selection or input mechanisms to provide/receive information (i.e., options to select whether 1 shooter, 2 shooters, 3 shooters, 4 shooters or 5+ shooters may be present). While certain selections have been depicted in FIG. 1E, it should be appreciated that other input mechanisms, such as text boxes or dropdown windows, may be utilized without departing from the present disclosure. When information is provided, this information may be fed directly to a first responder screen, as described in further detail below.

FIG. 1E also depicts a window wherein an emergency chat between users and/or first responders may occur. In this embodiment, the top of the chat window reflects "alert was initiated at 10:11 am by Mrs. Teacher 1, location Gym." It follows that the user who initiated the alert as well as other users that may have received the alert can communicate with one another through this emergency chat feature. In an emergency chat, the first message may display several pieces of information, including but not limited to, the time and location associated with the alert and the person who initiated the alert. Any subsequent messages posted within the emergency chat may also include a time stamp, an identification of the location from where the message was sent, and an identification of the person who posted the message. However, there may be embodiments where no first message is specified or the first message may include more, fewer or different items of information.

FIG. 1E further depicts several selection buttons marked as "mute," "cancel," and "logout." A user may opt to "mute"

an alert, for example, if he/she is not present at the location associated with the alert. If the alert is no longer active, the user may opt to "cancel" the alert, and in some embodiments of the present disclosure, the user may be presented with a pop-up window where the user must confirm that he/she wishes to cancel the alert. The user also may select the input "logout" when he/she wishes to exit the system. While buttons are depicted, it should be appreciated that other selection mechanisms may be utilized without departing from the present disclosure.

FIG. 1E further depicts where additional information may be received from/transmitted to a user. For example, the user may be provided with information about whether or not the police have been notified, and in this embodiment, the screen reflects that the police have not been notified.

Also, the user may be presented with several options in terms of a standardized action plan to respond to the alert, and this may be considered an action plan reminder in an embodiment of the present disclosure. This standardized action plan may be specific to a floor, a building, a campus, a city or other designation in embodiments of the present disclosure. In this embodiment, the user is presented with three options: run, fight, and hide. It should be appreciated that in some embodiments, the user may be allowed to select one of the options, but there may be embodiments where one of the options has already been selected and the user is being instructed to act in accordance with the selected option. If the user is considering what the action plan should be in connection with an alert, the user may select or hover over an option to receive more information about when the option should be selected or what the selection means. For example, in connection with the option "run" when the alert is an active shooter, several bullet instructions/guidelines may be provided including but not limited to, have an escape route in mind, leave your belongings, evacuate regardless whether others agree to follow, help others escape if possible, do not attempt to move the wounded, prevent others from entering an area where the active shooter may be, keep your hands visible, and call 911 when you are safe.

While FIGS. 1A-1E provide screen shots in connection with a shooter alert, it should be appreciated that the screens displayed may be similar for other types of alerts, but different types of information may be requested.

For example, in the case of a medical alert, the user may select his/her location but also may be prompted to provide information about the number injured as well as the type of injury (i.e., wound, broken bone, choking, poisoning, head injury, heart attack, seizures, neck or back injury, electrical injury, burn). There may be some embodiments where a user may be permitted to select more than one type of injury.

With a hazmat alert, the user may be prompted to provide information including, but not limited to, a description of the incident, the number injured, the types of injuries, names of products associated with the alert, product numbers (i.e., UN, NA (placard) or STCC) at issue, the type or description of the packaging associated with the product(s), and the size of amount of product(s) released.

When there is a bomb threat alert, information requested may include, but is not limited to: When will the bomb go off? What does the bomb look like? What kind of bomb is it? What will make the bomb explode? Did the person who called in the bomb threat place the bomb, what is the caller's name and gender, and why did the caller place the bomb? Other information that may be provided includes but is not limited to information about the caller's voice, whether there are background sounds on the call, and whether (and if so, what type of) threat language was used.

In connection with other alerts, it should be appreciated that the user may not be prompted for further information as described above; however, the options may be displayed in terms of the action plan to be deployed. For example, with a natural disaster alert, the action plan may change depending on the type of natural disaster (i.e., earthquake, flood, tornado, severe storm). When one option is selected, the user may click on or hover over that option and be provided with information on actions to be taken in response. Similarly, with an intruder alert, the user may be provided with guidance on how to respond in the action plan.

Figure 2A:
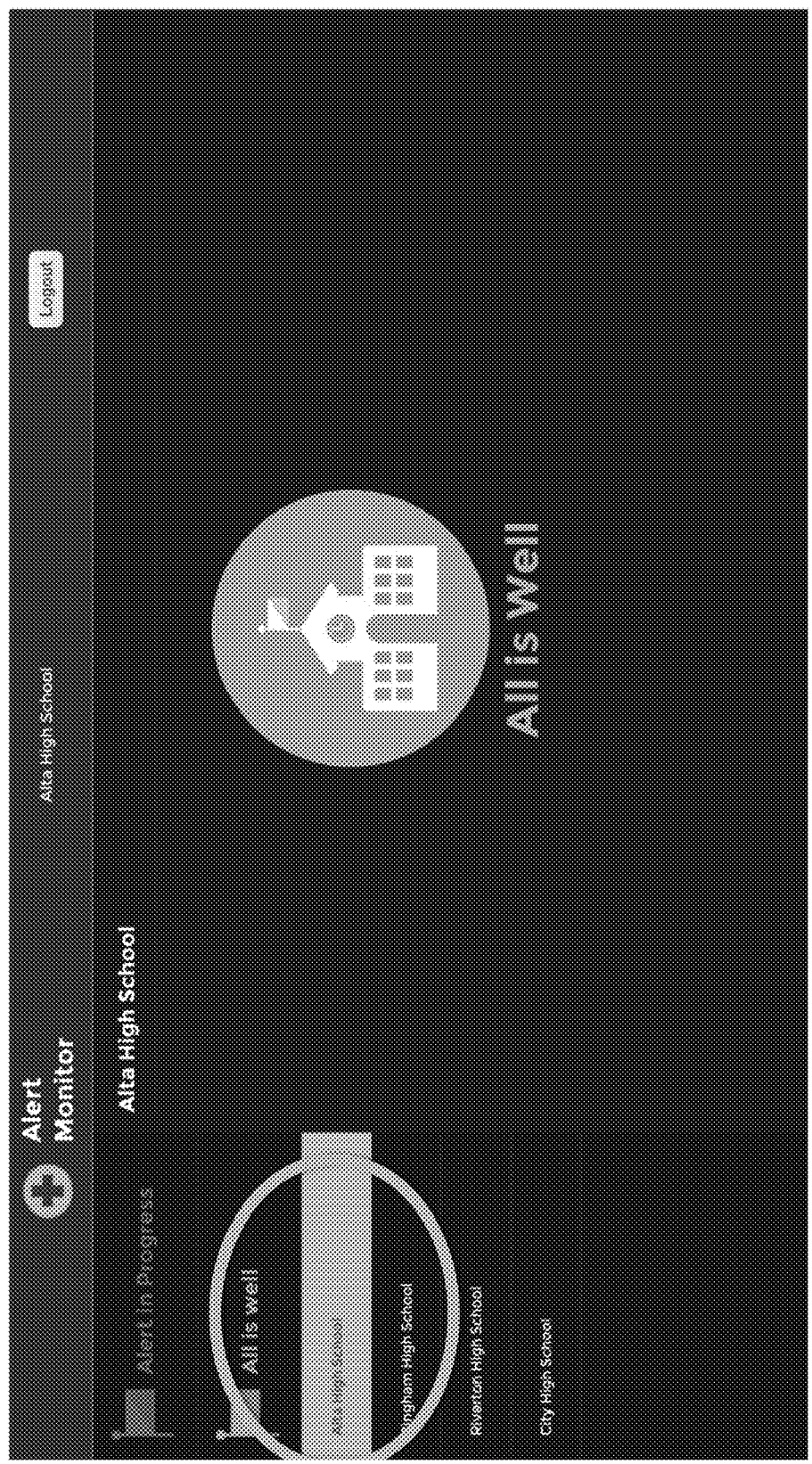
FIGS. 2A-2C depict screen shots illustrating how a first responder may access and utilize a system and method according to an embodiment of the present disclosure.
Figure 2B:
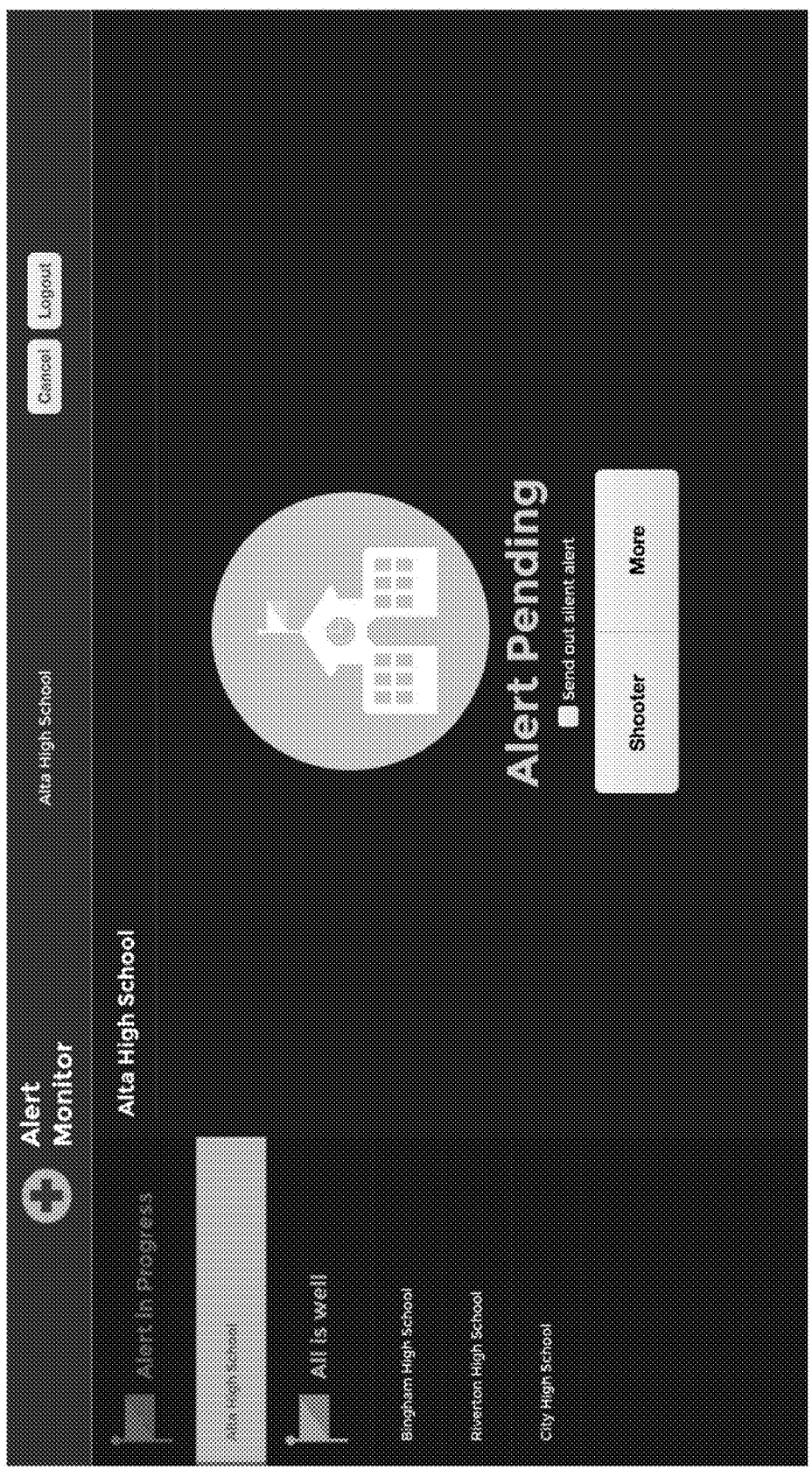
Figure 2C:
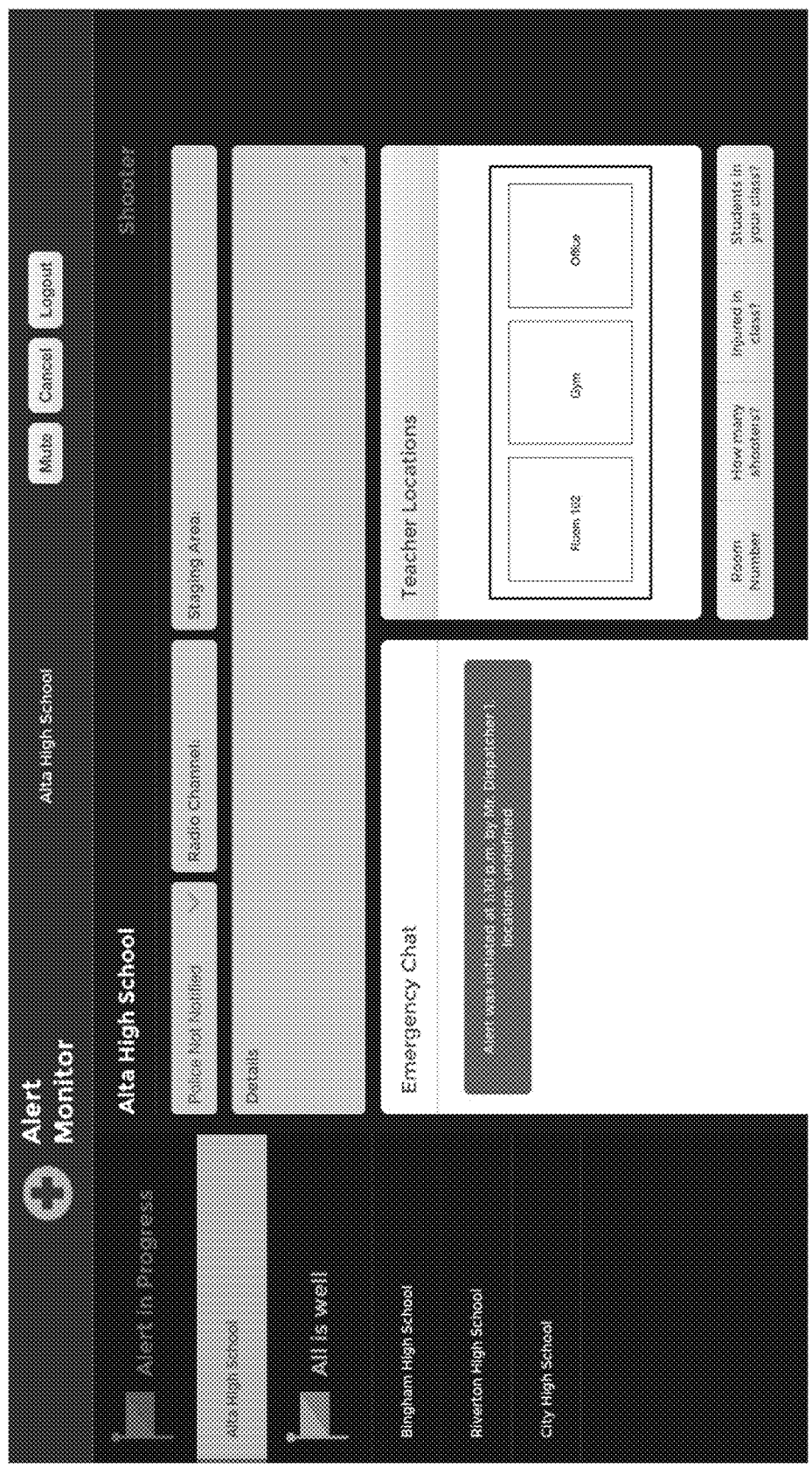

FIGS. 2A-2C provide screen shots depicting how a first responder may access and utilize a system and method according to embodiments of the present disclosure. A first responder may log into the system. Once he/she has accessed the system, the first responder may be presented with various buildings that are being monitored for alerts.

FIG. 2A depicts a screen shot of a scenario where a first responder is monitoring several high schools, and in this embodiment, there are no alerts for any of the schools (i.e., all is well). If there is an alert associated with one or more school being monitored, the school name would move from "All is well" to "Alert in Progress." Other indicators or designations may be used without departing from the present disclosure. A first responder may select a school (in this instance, Alta High School) and evaluate the status of alerts for that school individually, such as shown in FIG. 2A.

FIG. 2B depicts a scenario where an alert is in progress at Alta High School. Upon selection of Alta High School, the first responder would be provided with certain information known about the alert that is pending, and the first responder also may be prompted to make certain selections. For example, as shown in FIG. 2B, the first responder may select an option to send a silent alert. The first responder also may make a selection as to the type of alert. In FIG. 2B, the options are "Shooter" and "More." Upon selecting the "Shooter" option, the first responder may be taken to a different screen specific to a shooter scenario, such as depicted in FIG. 2C. Some aspects of this screen are similar to those described with respect to the user interface, such as the emergency chat feature that permits the first responder to chat in real-time with one or more users at the location being monitored; however, there are other selections that the first responder may make or information that may be provided on this screen that may not be available to the user. For example, the first responder may be able to view the locations of different users on a floor plan and may change room status depending on information provided relevant to the location. The first responder also may be able to review information that has been provided by users associated with the building or floor being monitored, including but not limited to, the room number where the shooter is presently located, the number of shooters, number injured, and people in room. As discussed with respect to FIGS. 1A-1E, the first responder may be provided with similar information depending on the type of alert.

Additionally or alternatively, as depicted in FIG. 2C, the first responder may be able to enter one or more items of information, including but not limited to, a radio channel associated with the building or floor being monitored that first responders may use to communicate with one another, an identification of the staging area to address the alert, and other details associated with the alert that may be relevant to other first responders and/or general users. In some embodiments of the present disclosure, the details section may be limited to internal discussion between first responders. It should be appreciated that these input mechanisms for communicating or displaying information may be text boxes in some embodiments of the present disclosure; however, other types of input mechanisms may be utilized without departing from the present disclosure.

FIG. 2C further permits the first responder to select the police status, such as "police not notified" is depicted in FIG. 2C. In some embodiments of the present disclosure, this input mechanism may be a dropdown menu where the first responder may select from one or more options, including, but not limited to, "police status," "police not notified," "police notified," and "police en-route."

It should be appreciated that the system according to embodiments of the present disclosure may be installed on various types of communication devices, including but not limited to, desktop computers, cellular/mobile phones, tablets and other devices having Internet access. Communication devices used to access the system according to embodiments of the present disclosure generally may include audio and speaker capabilities, text input, color display, as well as the ability to interact with the system through an input device such as a mouse pad or by touch. In some embodiments of the present disclosure, the communication device may include an integrated camera or the ability to add camera functionality via a connection (wireless or wired), thereby allowing the communication device to send and/or receive live video feed or photos relevant to the alert. In some embodiments of the present disclosure, the communication device also may include GPS or other similar geo-location capabilities.

In an embodiment of the present disclosure, the communication device may include an icon on its color display that a user/first responder may select using an input mechanism. Upon selection of this icon, an audio and/or visual alert may be generated, and this also may activate native feed and/or location services. Such audio and/or visual alert may be sent through one or more methods of communication, including but not limited to, emails, text messages and the like. In some embodiments of the present disclosure, this alert may override a user's communication device in order to provide the user with real-time information about the situation associated with the alert without taking further action. Once the alert has been generated, the user/first responder may input text or other information into the system to be shared with one or more other users/first responders associated with the system.

A first responder may listen to sound and/or monitor live video feed associated with an alert and/or communicate with users to provide assistance. The first responder also may locate users at the location associated with the alert and chat with other users/first responders accessing the system. He/she may use other tools associated with the system to view and/or update area layouts, maps, staging locations, radio channels, and other items relevant to the alert.

It should be appreciated that there may be embodiments of the present disclosure where the alerts may be disseminated to a predetermined group. In certain embodiments of the present disclosure, the first responders may select certain user groups and/or locations in which to reverse trigger, cancel or change an alert. It also should be appreciated that users may opt-in on alerts for selected locations. These options may be adjusted through a profile that the user creates within the system. This profile may include personal information that may be utilized by certain users, particularly first responders, for emergency purposes.

While the system and method according to embodiments of the present disclosure have generally been described in the context of an emergency response scenario, it should be appreciated that the system and method may be adapted for use in non-emergency response scenarios as well without departing from the present disclosure. The system and method according to embodiments of the present disclosure generally should allow alerts to be disseminated rapidly, such as within a few seconds after a user/first responder accesses the system. Further, the system and method according to embodiments of the present disclosure is not limited to use with respect to certain buildings or locations.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for integrated emergency notification through a single system, the method being performed by a processor executing instructions on a non-transitory computer-readable medium, the method comprising the steps of:
   selecting, on a communication device, an alert to be sent out to one or more additional users over a communication network connected to the single system;
   selecting, on the communication device, an alert type;
   identifying, on the communication device, one or more locations associated with the alert type, wherein at least one floor plan is associated with the one or more locations;
   selecting, on the communication device, one of the at least one floor plan;
   viewing, on the communication device, color coding associated with the selected one of the at least one floor plan, wherein the color coding is updated in real-time to show status;
   designating, on the communication device, where presently located on the selected one of the at least one floor plan; and
   receiving, on the communication device, an action plan reminder associated with the alert type accessible to any user of the single system, wherein the user is prompted to designate where presently located after a predetermined period of inactivity.

2. The method of claim 1, wherein the alert is an audible alert that immediately notifies all users of one or more conditions associated with the alert.

3. The method of claim 1, wherein the alert is a silent alert.

4. The method of claim 1, wherein the alert is an internal alert only to users at a location associated with the alert.

5. The method of claim 1 wherein the alert type is selected from the following:
   shooter, medical, bomb, hazmat, natural disaster, intruder, and other.

6. The method of claim 1, the color coding including a first color to indicate areas deemed to be safe, a second color to indicate areas deemed to be unsafe, and a third color to indicate areas where conditions are unknown.

7. The method of claim 1 wherein written designations are displayed in addition to color coding.

8. The method of claim 1 further comprising:
providing, on the communication device, additional information about conditions associated with the alert type.

9. The method of claim 1 wherein the action plan reminder is specific to one or more of the following:
a floor, a building, a campus, and a city.

10. A method for integrated emergency notification through a single system, the method being performed by a processor executing instructions on a non-transitory computer-readable medium, the method comprising the steps of:
selecting, on a communication device, an alert to be sent out to one or more additional users over a communication network connected to the single system;
selecting, on the communication device, an alert type;
identifying, on the communication device, one or more locations associated with the alert type, wherein at least one floor plan is associated with the one or more locations;
selecting, on the communication device, one of the at least one floor plan;
viewing, on the communication device, color coding associated with the selected one of the at least one floor plan, wherein the color coding is updated in real-time to show status;
receiving, on the communication device, an action plan reminder associated with the alert type accessible to any user of the single system; and
selecting, on the communication device, one of three options from the action plan reminder, the three options comprising:
run, fight and hide.

11. The method of claim 1 further comprising:
chatting, on the communication device, in real-time with one or more persons associated with the one or more locations associated with the alert type.

* * * * *